United States Patent Office 2,932,559
Patented Apr. 12, 1960

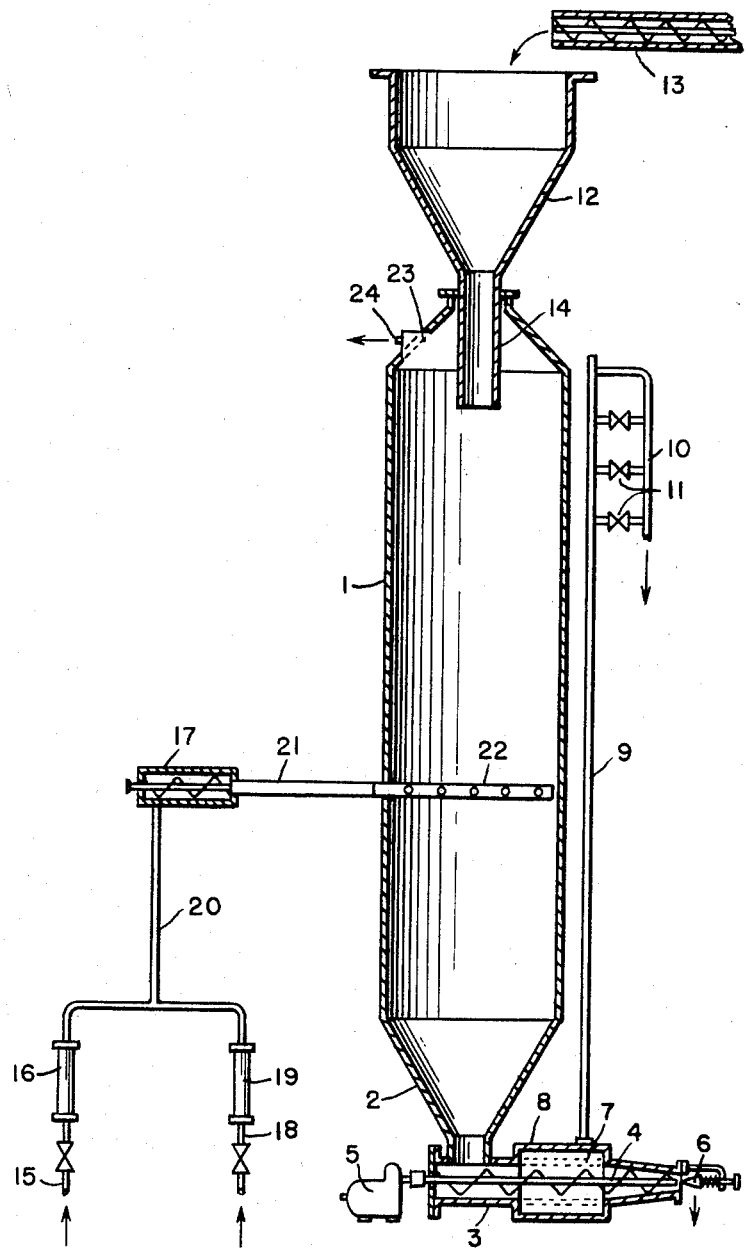

2,932,559

PROCESS AND APPARATUS FOR THE CONTINUOUS EXTRACTION OF MATERIALS

Adolph Placek, Philadelphia, Pa., assignor to Acme Process Equipment Company

Application November 22, 1957, Serial No. 698,237

6 Claims. (Cl. 23—310)

The invention of which the following is a detailed specification, relates to improved process and apparatus for the continuous extraction of materials simultaneously by two mutually insoluble solvents or solvent mixtures.

The invention is adapted for the extraction of oleaginous seeds or their flakes, animal and vegetable meals, suitably ground minerals, dispersed fluids and like materials. The extraction is accomplished by the use of two mutually insoluble solvents or solvent mixtures. In this way simultaneous extraction can be accomplished of those portions which may be dissolved in either of the solvents. The solvents may be hydrocarbons and water; or oils and alcohols and the like. The primary principle involved is that the two solvents may be finely mixed and introduced into the material to be extracted, whereupon the individual solvents will separate and react upon the material. As the solvents will differ in specific gravity, the resulting miscella, i.e., solvents charged or saturated with the extractives, will separate in different directions. They will thus be easily recovered individually and not dependent upon subsequent decantation or similar modes of separation.

The extraction and differential separation is performed by the action of gravity. However, centrifugal force may also be utilized to facilitate the individual extracting action of the solvents and their concurrent separation.

The process uses a mixture of two mutually insoluble solvents which during the process gradually separate into two phases by decantation. The two phases move in opposite direction to each other during the selective extraction of soluble substances from the material. The extractives are different depending upon the capability of the individual solvents.

The feed of the material is controlled solely by the discharge of the extracted material, since the extraction vessel is always filled with material and the bottom or discharge end of the feeding chute is automatically blocked by the extracted material when the vessel is full. As the material is exhausted and discharged from the bottom of the vessel, a fresh charge is automatically and continuously supplied at the top.

In the extraction of solid materials, the extraction vessel does not require any devices for distribution or fractionating, since the material itself accomplishes a complete distribution. If the material to be extracted is a liquid, the operation may be facilitated and supplemented by the use of distributing and fractionating devices, such as bubble-cap plates, sieve plates or packing materials.

It is an object of this invention to provide simultaneous extraction of solid material by means of two mutually insoluble solvents.

It is a further object of the invention to maintain a flow of one solvent in a countercurrent with respect to the flow to be extracted, while at the same time permitting the other solvent to flow concurrenly with the material.

Among the objects of my invention is to maintain the solvents in contact with the material by means of hydrostatic pressure.

Among the objects of the invention is to control the feed of fresh material by the rate of discharge of the material extracted.

One of the objects of the invention is to maintain a continuous extraction of two dissimilar solvents solely by the force of gravity. In carrying out the invention it is possible to avoid the use of mixing or conveying devices and to prevent intermingling of concentrated miscella with dilute miscella.

The invention also includes a novel apparatus appropriate for the accomplishment of the purposes above described.

The novel process and the operation utilized are exemplified on the accompanying diagrammatic drawing of the preferred apparatus.

As one form of carrying out the invention, I have shown on the accompanying diagram a vertical liquid-tight vessel 1. This vessel has a conical bottom 2, which leads to a discharge chamber 3. The chamber 3 is provided with a conveyor screw 4 driven by a variable speed motor 5. At the end of the conveyor 4, the solid material remaining in the chamber 3, is discharged through a pressure-controlled valve 6.

The chamber 3 has a cylindrical screen wall section 7. This is surrounded by a jacket 8. An adjustable overflow pipe 9 rises from the jacket 8 to a height above the level of the material in the vessel 1. The pipe 9 is provided at the top with a discharge pipe 10 which is connected to the pipe 9 by a number of valves 11, 11, by which the level of the charged solvent can be varied.

The top of the vessel 1 supports a hopper 12 which is fed by conveyor 13 from a supply of material to be extracted. The hopper 12 has an inlet pipe or chute 14, which extends a considerable distance down into the vessel 1 and within the material of which the vessel is kept charged.

One solvent is fed from a supply pipe 15 through a rotometer or similar pump 16 to a mixing chamber 17. A second solvent which is not soluble with the first named one, is fed from a supply pipe 18 through a rotometer or similar pump 19 to the mixing chamber 17 by the common pipe 20. An intimate mixture of both solvents is fed through a common pipe 21 to a sprinkler or sparger 22 at an intermediate point in the vessel 1.

The top of the vessel 1 is provided with a screen 23 from which a discharge 24 carries the enriched miscella which has travelled countercurrently from the vessel.

Suitable means such as a stirrer or like device may be provided within the vessel 1 to establish a rotation of the material and solvents, thus increasing the length of contact between the two during the travel through the vessel.

The principle of the invention is that an intimate mixture of two mutually insoluble solvents will separate gradually while in contact with the slowly moving material to be extracted. The solvent of heavier gravity will flow in a concurrent stream with the material. This solvent becomes enriched by the time the solvent reaches the discharge at the bottom of the vessel.

Some fresh solvent of a relatively lighter specific gravity will be entrained and carried down, thus being effective to strip the material of extractives before the enriched lighter solvent changes its direction and rises in a countercurrent.

The fresh solvent of lighter gravity rising from the point of introduction, will dissolve extractives and be enriched by the time it reaches the top of the vessel. It will of course include the portion of the lighter solvent originally carried down below the free end before it begins to rise.

In like manner some of the heavier solvent will also tend to rise with the lighter solvent before separation is complete.

This heavier fresh solvent will be most effective for extracting the fresh material delivered at the top of the column. It will then move concurrently to the bottom of the column completing the extraction of the material.

During the extraction the exhausted material will be continuously withdrawn through the conical bottom 2 and compressed by the spiral conveyor 4. The enriched miscella of heavy gravity thus filtered through the screen 7 will then rise through the pipe 9 and be discharged through the outlet pipe 10. This operation maintains a desired adjusted level of liquid in the mass of material contained in the vessel.

The enriched solvent of lighter specific gravity will be strained through the filter 23 and discharged through the outlet 24.

It will be evident that the individual solvents will become enriched and separated before leaving the treating vessel 1. This avoids the necessity of subsequent stratification or decantation.

As an example of the practical application of this process, consideration may be given to the separation of extractives from crushed cotton seed which have been suitably treated with steam. Thus one solvent will be water, supplementing the steam which is present. Presumably this will be the solvent of heavier gravity.

The other solvent may be a hydrocarbon which is lighter than water, such as hexane, or the like. This is miscible with water, but neither is soluble in the other. The relative amounts of each solvent can be selected at will. The solvents are blended or mixed and fed through the common pipe 21 and spray equipment 22 into the mid-portion of the vessel 1. There the solvents tend to separate into extremely fine droplets which individually and selectively extract the material. The heavier watery layer passes through the screw press 4 and screen 7 into the overflow pipe 9. At the same time the hexane with its charge or extractives will rise through the top of the mass of material. It is there screened at 23 and discharged through pipe 24.

Even if the density of the miscella increases through extraction, the intermixing by convection of the more concentrated miscella stratum with the less concentrated miscella stratum is avoided, and the extraction proceeds strictly in a countercurrent manner from one charge of extraction to another.

Numerous other water insoluble solvents such as chlorinated compounds, oils and the like, may be used in place of the hexane. In like manner suitable alcohols of solvent capacity may be substituted for the water, providing they are not soluble in the other solvents which are being used.

It will be readily apparent to those skilled in the art that the above process is applicable to a wide range of solvents.

The process also may be followed by varying the relative proportions of the several solvents dependent upon the extractives present in the raw material. The separation may take place while the mass of material moves downwardly in the vessel or agitation may be supplied to produce a rotary centrifugal force to supplement the differential effect of gravity alone.

In like manner the structural arrangement of the apparatus is susceptible of modification in minor details.

While I have shown and described my preferred example of process and form of apparatus, minor changes are possible within the scope of the appended claims.

What I claim is:

1. The process of simultaneously extracting separately soluble products from a downwardly moving mass of solid material which comprises introducing into an intermediate point in the mass a stream of two intimately mixed mutually insolbule solvents of different gravity, withdrawing the mass at the lower end of its travel together with the solvent of higher gravity, removing the solvent with its extractives from the withdrawn mass, and removing the solvent of lower gravity with its extractives from the upper end of the moving mass.

2. The process of simultaneously extracting seperately soluble products from a downwardly moving mass of solid material which comprises continuously feeding raw solid material below the top of the mass, introducing a stream of two intimately mixed mutually insoluble solvents of different gravity into the mass at an intermediate point, withdrawing the countercurrent flow of solvent of lighter gravity and its extractives from the incoming fresh material, withdrawing the concurrent flow of solvent of heavier gravity with the exhausted material at the lower end of its travel, and removing said last named solvent and its extractives from said exhausted material.

3. The process of simultaneously extracting separately soluble products from a downwardly moving mass of solid material which comprises introducing into an intermediate point in the mass a stream of two intimately mixed mutually insoluble solvents of different gravity, contacting the mass at said point with finely divided solvent particles, causing the solvent particles of higher gravity to coalesce into a stream moving through the mass concurrently, causing the solvent particles of lower gravity to coalesce into a stream moving countercurrently through the mass, and removing the separate solvent streams at the opposite ends of the mass.

4. Apparatus for solvent extraction comprising a vertically arranged vessel, a material inlet at the top having a depending tube, a liquid discharge above the bottom of the tube, a solids conveyor at the bottom of the vessel, a liquid discharge strainer on the conveyor, a liquid riser from the strainer, a liquid sparger in the vessel at an intermediate height, a liquid mixer connected to the sparger and branch pipes to the mixer from sources of dissimilar nonmiscible solvents.

5. An apparatus for the simultaneous extraction of material by mutually insoluble solvents, comprising a vertically disposed vessel having a hopper at the top, an inlet pipe extending from the hopper into the upper part of the vessel, a fluid discharge from the vessel above the lower end of the pipe, a discharge from the bottom of the vessel, a spray device in an intermediate point of the vessel, a solvent mixer for feeding the spray device and pipes to the mixer from separate solvent supplies.

6. An apparatus for the simultaneous extraction of material by mutually insoluble solvents, comprising a vertically disposed vessel having an inlet at the top, a discharge chamber from the bottom of the vessel, a jacketed screen section for the chamber, a pressure operated discharge from the chamber, a fluid discharge pipe extending upwardly from the screen section, a spray device in an intermediate point of the vessel, a solvent mixer for feeding the spray device and pipes to the mixer from separate solvent supplies.

References Cited in the file of this patent

UNITED STATES PATENTS

| | | |
|---|---|---|
| 1,912,349 | Tuttle | May 30, 1933 |
| 2,096,728 | Bighouse | Oct. 26, 1937 |
| 2,245,945 | Van Dijck et al. | June 17, 1941 |
| 2,346,491 | Kiersted | Apr. 11, 1944 |
| 2,517,143 | Straight | Aug. 1, 1950 |